United States Patent Office 3,432,485
Patented Mar. 11, 1969

3,432,485
CHROMIUM CONTAINING MIXED AZO DYES
Reinhard Neier, Basel, Switzerland, assignor to Sandoz Ltd. (also known as Sandoz A.G.) Basel, Switzerland
No Drawing. Filed July 21, 1966, Ser. No. 566,744
Claims priority, application Switzerland, July 23, 1965, 10,400/65
U.S. Cl. 260—145
Int. Cl. C09b 31/00
5 Claims This invention relates to a process for the production of heterogeneous metal complex dyes, which consists in reacting with an amount of a chromium compound yielding at least 1 equivalent of chromium a mixture of $n$ moles of a disazo dye of formula

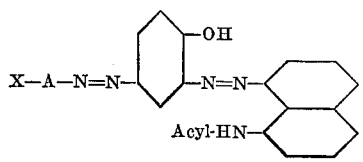

(I)

and $(2-n)$ moles of a monoazo dye of formula

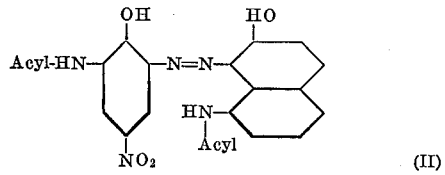

(II)

where $n$ represents a value between 0.5 and 1.5, preferably between 0.8 and 1.2, A an aryl radical, and X a carboxylic or sulphonic acid or sulphonic acid amide group. The individual dyes of Formulae I and II in the form of their chromium complexes are known. In Formula I, A represents preferably a phenyl or naphthyl radical. These radicals may be further substituted, for example by alkyl or alkoxy, e.g., with 1 to 6 carbon atoms, which may be substituted, or by halogen atoms such as chlorine, bromine or fluorine atoms. In the especially preferred phenyl radical the substituent X may occupy the ortho-, meta- or para-position in respect to the azo group. When X represents a sulphuric acid amide group it may be substituted, for example by a hydroxyalkyl radical. The acyl radicals in Formulae I and II are preferably lower alkylcarbonyl or sulphonyl radicals, in particular alkylcarbony radicals having 1 to 4 C atoms; the alkyl radicals of the alkylcarbonyl groups may be substituted, primarily by halogen such as chlorine, bromine or fluorine, or by hydroxyl or alkoxy groups with, for example, 1 to 4 C atoms. Examples of other suitable acyl radicals are lower alkoxy carbonyl groups whose alkyl radicals may be substituted, for example by lower alkoxy groups.

The metallisation reaction can be carried out in one stage, that is to say, the dyes of Formulae I and II can be metallised simultaneously. It can be conducted in aqueous solution or in an organic medium, for example formamide, or in the concentrated aqueous solution of an alkali metal salt of a lower aliphatic monocarboxylic acid at temperatures of 80° to about 130° C. An amount of a chromium-yielding agent containing at least 1 but preferably less than 2 gram equivalents of chromium is allowed to act upon 2 moles of the mixture of dyes.

Examples of suitable chromium compounds are chromic fluoride, chromic sulphate, chromic formate, chromic acetate, chromic potassium sulphate and chromic ammonium sulphate. The chromates also, for example sodium or potassium chromate or bichromate, are very suitable, especially in strongly caustic-alkaline medium, in which case reducing substances can be added if necessary.

It is of special advantage to perform the metallising reaction in aqueous or alkali medium in the presence of compounds which maintain the metal dissolved in complex combination, for example tartaric, citric, lactic or salicylic acid.

Alternatively, the metallising reaction can be carried out in two stages, the 1:1 chromium complex compound of a dye of Formula I or II being produced first and this reacted with the second metal-free dye to form the 1:2 complex. One suitable procedure is to react one of the two dyes, most expediently the one of Formula I which contains a sulphonic acid group, in acid medium with an excess of the trivalent chromium such as chromium formate, chromium sulphate or chromium fluoride, either at the boil or at a temperature superior to the boil. The dyes which are free from sulphonic acid groups are converted into the 1:1 chromium complexes preferably in an organic solvent, for example ethanol or formamide.

The reaction of the 1:1 metal complexes with the metal-free dyes can be effected in aqueous, neutral or weakly alkaline medium at normal or elevated temperature, e.g., in the temperature range of 80° to 130° C.

The dyes thus formed are 1:2 heterogeneous chromium complexes. In aqueous solution they are suitable for dyeing leather and for dyeing, padding or printing animal fibres, for example wool or silk, and synthetic polyamide fibres.

They are well soluble in polar solvents, for example acetone, ethanol and ethyl acetate, and in these solutions they are suitable for dyeing and printing leather and for dyeing fibre-forming materials likewise dissolved in organic solvents. In these materials they give olive green shades of good light and wet fastness.

Wool, silk and polyamide fibres are dyed or printed preferably from a weakly acid, neutral or weakly alkaline medium, for example in the presence of acetic acid, ammonium sulphate or sodium metaphosphate. They can also be dyed from an acetic acid to neutral bath in the presence of leveling agents, of which polyoxethylated fatty amines and mixtures of these and alkylpolyglycol ethers are examples, at temperatures of 90° to about 130° C., e.g., 95°–108° C. or more particularly 98°–102° C. without pressure and 120–130° C. with pressure for polyamide fibres.

The dyeing obtained have good fastness to light and wet tests such as washing, milling, perspiration, water, sea water, acids, alkalis, carbonising, stoving, cross dyeing and decatising. They are stable to heat and show little sensitivity to metals.

In the following examples the parts and percentages are by weight and the temperatures in degrees centigrade.

EXAMPLE 1

28.9 parts of the disazo compound obtained by coupling diazotised 3' - amino - 4' - hydroxy-1,1'-azobenzene-3-sulphonic acid amide with 1-carbo-(2'-ethoxy)-ethoxyamino-7-hydroxynaphthalene and 24.9 parts of the monoazo compound obtained by coupling diazotised 2-amino-1-hydroxy-4-nitro-6-acetylaminobenzene with 1-carbo-(2'-ethoxy)-ethoxyamino-7-hydroxynaphthalene are stirred into 200 parts of formamide. After the addition of 25 parts of chromic ammonium sulphate $(NH_4Cr(SO_4)_2 \cdot 12H_2O)$ the mixture is stirred at 100–110° until the unmetallised starting dyes are no longer indicated. It is then diluted with 600 parts of 20% sodium chloride solution and the chromium complex compound formed is precipitated, isolated and purified by dissolving in aqueous alkaline medium, reprecipitation with common salt and filtration. After drying and grinding, the dye is obtained as a dark powder which dissolves in water to give olive green solutions. It dyes wool, silk, leather and polyamide fibres in olive green shades of excellent light fastness; the dyeings are also notable for high fastness to washing, milling, perspiration, water, heat, acids, chlorine, carbonising, stoving and cross dyeing.

The dye, being well soluble in polar organic solvents, is suitable for the mass dyeing of organic fibre-forming materials such as cellulose acetate and polyacrylonitrile.

excellent light fastness and good fastness to milling, washing, perspiration, water, heat, acids, chlorine, carbonising, stoving and cross dyeing.

A dye with similar properties is obtained when 18.5 parts of the aforenamed disazo dye and 33.5 parts of the aforenamed monoazo dye are reacted with a chromium compound in accordance with the procedure described in Example 1.

TABLE

| Example No. | Disazo dye | Monoazo dye | Metal | Shade of wool dyeing |
|---|---|---|---|---|
| 3 | 1-(3'-amino-4'-hydroxy)-phenyl-azo-naphthalene-4-sulphonic acid → 1-acetylamino-7-hydroxy-napthalene. | 2-amino-1-hydroxy-4-nitro-6-acetyl-amino-benzene → 1-carbo-(2'-ethoxy)-ethoxyamino-7-hydroxy-naphthalene. | Cr | Olive. |
| 4 | 1-(3'-amino-4'-hydroxy)-phenyl-azonaphthalene-5-sulphonic acid → 1-carbethoxyamino-7-hydroxy-naphthalene. | 2-amino-1-hydroxy-4-nitro-6-acetyl-amino-benzene → 1-dimethyl-amino-sulphonyl-amino-7-hydroxy-naphthalene. | Cr | Do. |
| 5 | 1-(3'-amino-4'-hydroxy)-phenyl-azonaphthalene-5-sulphonic acid → 1-carbo-(2'-ethoxy)-ethoxy-amino-7-hydroxynaphthalene. | 2-amino-1-hydroxy-4-nitro-6-acetyl-amino-benzene → 1-acetylamino-7-hydroxynaphthalene. | Cr | Do. |
| 6 | 2-(3'-amino-4'-hydroxy)-phenyl-azonaphthalene-6-sulphonic acid → 1-carbomethoxyamino-7-hydroxy-naphthalene. | 2-amino-1-hydroxy-4-nitro-6-carbethoxyaminobenzene → 1-acetylamino-7-hydroxynaphthalene. | Cr | Do. |
| 7 | 1-(3'-amino-4'-hydroxy)-phenyl-azonaphthalene-6-sulphonic acid → 1-propionylamino-7-hydroxy-naphthalene. | 2-amino-1-hydroxy-4-nitro-6-acetyl-aminobenzene → 1-carbethoxy-amino-7-hydroxynaphthalene. | Cr | Do. |
| 8 | 3'-amino-4'-hydroxy-1,1'-azobenzene-4-sulphonic acid → 1-benzoyl-amino-7-hydroxynaphthalene. | 2-amino-1-hydroxy-4-nitro-6-acetyl-aminobenzene → 1-carbo-(2'-ethoxy)-ethoxyamino-7-hydroxy-naphthalene. | Cr | Do. |
| 9 | 3'-amino-4'-hydroxy-1,1'-azobenzene-2-sulphonic acid → 1-acetylamino-7-hydroxynaphthalene. | 2-amino-1-hydroxy-4-nitro-6-formyl-aminobenzene → 1-acetylamino-7-hydroxynaphthalene. | Cr | Do. |
| 10 | 3'-amino-4'-hydroxy-1,1'-azobenzene-2-carbonic acid → 1-carbethoxy-amino-7-hydroxy-naphthalene. | 2-amino-1-hydroxy-4-nitro-6-acetyl-aminobenzene → 1-carbo-(2'-ethoxy)-ethoxy-amino-7-hydroxy-naphthalene. | Cr | Do. |
| 11 | 3'-amino-4'-hydroxy-2-methyl-1,1'-azobenzene-5-sulphonic acid → 1-acetylamino-7-hydroxynaphthalene. | do | Cr | Do. |
| 12 | 3'-amino-4'-hydroxy-1,1'-azobenzene-3-sulphonic acid-methyl-amide → 1-acetylamino-7-hydroxynaphthalene. | do | Cr | Do. |
| 13 | 1-(3'-amino-4'-hydroxy-phenylazo-naphthalene-4-sulphonic acid → 1-methansulphonylamino-7-hydroxy-naphthalene. | 2-amino-1-hydroxy-4-nitro-6-acetyl-aminobenzene → 1-benzenesulphonyl-amino-7-hydroxynaphthalene. | Cr | Do. |

It can also be used for pigmenting surface coatings such as vinyl and nitrocellulose lacquers in olive green shades.

A dye with similar properties is obtained when 43.2 parts of the aforenamed disazo dye and 12.5 parts of the monoazo dye are metallised in accordance with the particulars given in this example.

EXAMPLE 2

2.7 parts of the disazo compound obtained by coupling diazotised 1 - (3' - amino-4'-hydroxy)-phenylazonaphthalene-5-sulphonic acid with 1-acetylamino-7-hydroxynaphthalene are stirred in 200 parts of ethylene glycol, with the subsequent addition of 25 parts of chromic ammonium sulphate $(NH_4Cr(SO_4)_2 \cdot 12H_2O)$. The mixture is raised to 130° and held at this temperature for a few hours, after which the metal-free dye is no longer indicated. It is allowed to cool to 100°, on which 24.9 parts of the monoazo compound obtained by coupling 24.9 parts of diazotised 2 - amino - 1-hydroxy-4-nitro-6-acetylaminobenzene with 1-carbo-(2'-ethoxy)-ethoxyamino-7-hydroxy-naphthalene are added, together with 100 parts of formamide. Stirring is continued for a further hour at 100°. After this time no further metal-free dye is indicated in the reaction mixture. It is diluted with a solution of 100 parts of sodium chloride in 700 parts of water, on which the dyestuff precipitates. On isolation it is purified by dissolving in water with the aid of sodium hydroxide, precipitation with sodium chloride and filtration. On drying and grounding it is obtained as a dark powder which dissolves in water with an olive coloration and dyes wool, silk, leather and polyamide fibres in olive-green shades of

APPLICATION EXAMPLE A

A dyebath is prepared by dissolving 1 part of the dye obtained according to Example 2 in 4000 parts of water at 40–50°. 100 parts of previously wetted out wool are entered into the bath, 2 parts of acetic acid are added dropwise, and the bath is raised in 30 minutes to 100° and maintained at the boil for a further hour. The wool is then removed, rinsed with water and dried. An olive green dyeing is obtained which has good light and wet fastness properties.

A dyeing showing the same fastness properties is obtained when the 100 parts of wool are replaced by 100 parts of nylon.

APPLICATION EXAMPLE B

A solution is prepared with 20 parts of a vinyl chloride/vinyl acetate copolymer, for example Vinylite VMCH (registered trademark of Union Carbide, Inc.), 70 parts of methylethylketone and 10 parts of ethylene glycol. To this is added a solution of 0.5 part of the dye obtained according to Example 1 in 10 parts of the same lacquer, and finally the composition is diluted with 25 parts of a 1:1 mixture of methylethylketone and cyclohexanone. It is applied to aluminium foil and dried in the air. The coating, which is of olive-green colour, has good adhesibility, good resistance to wet rubbing, fats and top finishes, and excellent fastness to light.

Formulae of representative dyes of the foregoing examples are as follows:

EXAMPLE 14

The 1:2 chromium mixed complex of 1 mol of the azo-compound of the formula

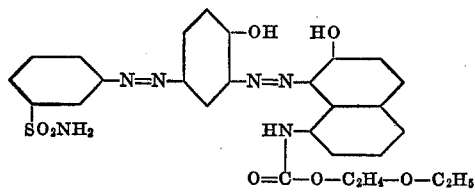

and 1 mol of the azo compound of the formula

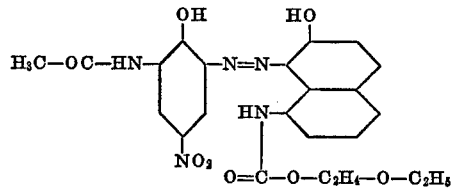

EXAMPLE 15

The 1:2 chromium mixed complex of 1 mol of the azo compound of the formula

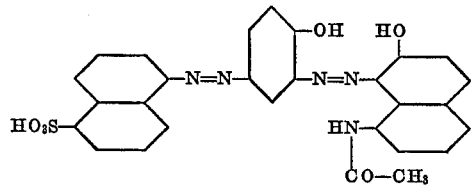

and 1 mol of the azo compound of the formula

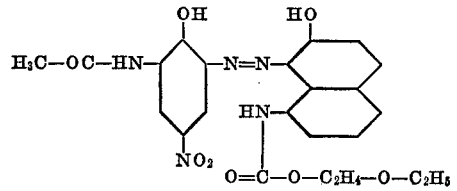

EXAMPLE 16

The 1:2 chromium mixed complex of 1 mol of the azo compound of the formula

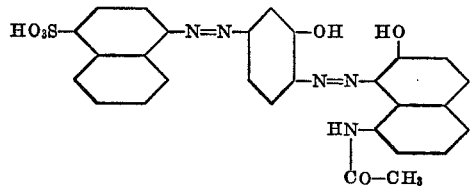

and 1 mol of the azo compound of the formula

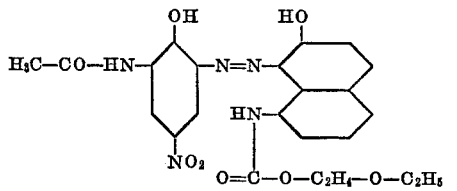

EXAMPLE 17

The 1:2 chromium mixed complex of 1 mol of the azo compound of the formula

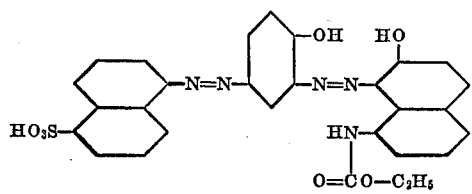

and 1 mol of the azo compound of the formula

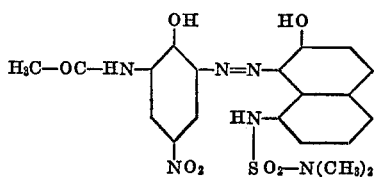

EXAMPLE 18

The 1:2 chromium mixed complex of 1 mol of the azo compound of the formula

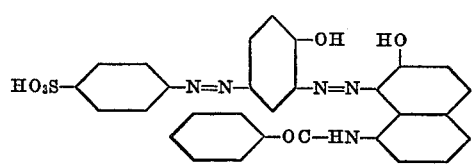

and 1 mol of the azo compound of the formula

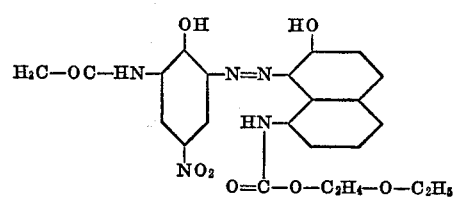

I claim:
1. The 1:2 chromium mixed complex of 1 mol of the azo compound of the formula

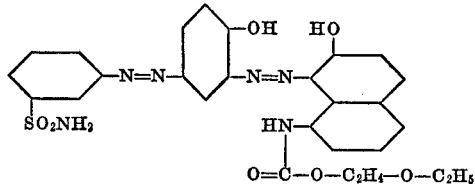

and 1 mol of the azo compound of the formula

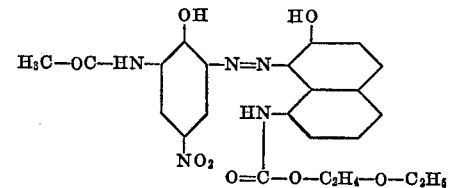

2. The 1:2 chromium mixed complex of 1 mol of the azo compound of the formula

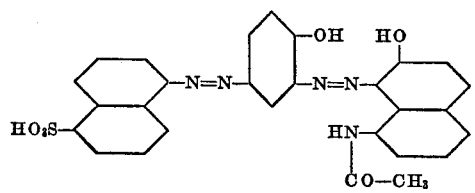

and 1 mol of the azo compound of the formula

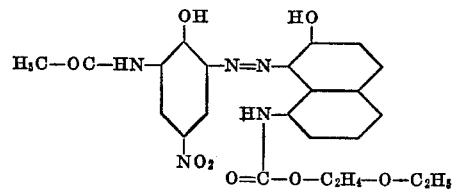

3. The 1:2 chromium mixed complex of 1 mol of the azo compound of the formula

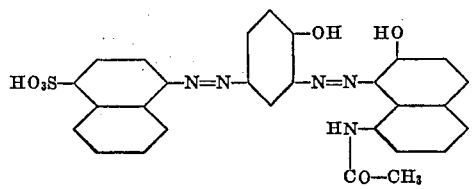

and 1 mol of the formula

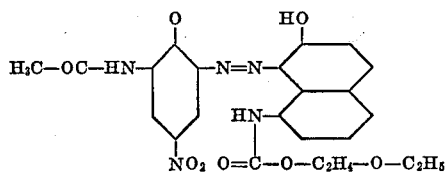

4. The 1:2 chromium mixed complex of 1 mol of the azo compound of the formula

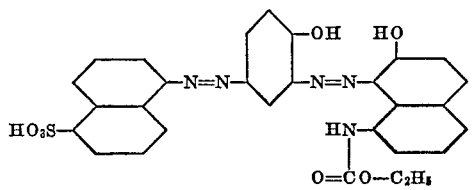

and 1 mol of the azo compound of the formula

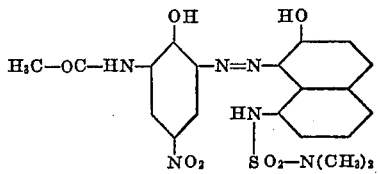

5. The 1:2 chromium mixed complex of 1 mol of the azo compound of the formula

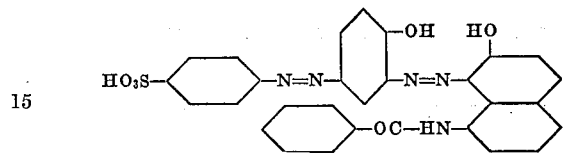

and 1 mol of the azo compound of the formula

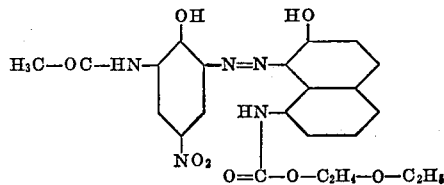

References Cited
UNITED STATES PATENTS 2,610,175　9/1952　Widmer et al. _____ 260—145
2,775,581　12/1956　Neier et al. _____ 260—145

CHARLES B. PARKER, *Primary Examiner.*

D. M. PAPUGA, *Assistant Examiner.*

U.S. Cl. X.R.

260—198, 151, 37, 148, 190, 206; 8—42, 43, 13

UNITED STATES PATENT OFFICE
CERTIFICATE OF CORRECTION

Patent No. 3,432,485

March 11, 1969

Reinhard Neier

It is certified that error appears in the above identified patent and that said Letters Patent are hereby corrected as shown below:

Column 1, line 47, "alkylcarbony" should read -- alkylcarbonyl --. Column 3, line 55, "hydroxzynaph-" should read -- hydroxynaph- --. Column 7, lines 1 to 25, that portion of the formula reading

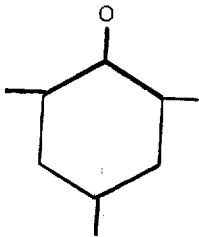 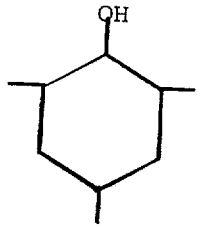

(SEAL)
Attest:

Signed and sealed this 24th day of March 1970.

Edward M. Fletcher, Jr.
Attesting Officer

WILLIAM E. SCHUYLER, JR.
Commissioner of Patents